(12) United States Patent
Plaehn et al.

(10) Patent No.: US 11,142,174 B2
(45) Date of Patent: Oct. 12, 2021

(54) METHOD FOR A UTILITY VEHICLE WHICH HAS A TRAILER COUPLING, DEVICE AND UTILITY VEHICLE FOR SAID METHOD, AND COMPUTER PROGRAM PRODUCT FOR SAME

(71) Applicant: Wabco GmbH, Hannover (DE)

(72) Inventors: Klaus Plaehn, Seelze (DE); Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 17/253,637

(22) PCT Filed: Jun. 3, 2019

(86) PCT No.: PCT/EP2019/064279
§ 371 (c)(1),
(2) Date: Dec. 18, 2020

(87) PCT Pub. No.: WO2019/243027
PCT Pub. Date: Dec. 26, 2019

(65) Prior Publication Data
US 2021/0261104 A1    Aug. 26, 2021

(30) Foreign Application Priority Data
Jun. 20, 2018  (DE) ..................... 10 2018 114 852.6

(51) Int. Cl.
*B60T 7/20*      (2006.01)
*B62D 53/08*     (2006.01)

(52) U.S. Cl.
CPC ............. *B60T 7/20* (2013.01); *B60T 2230/06* (2013.01); *B60T 2250/03* (2013.01); *B62D 53/08* (2013.01)

(58) Field of Classification Search
CPC .... B60T 7/20; B60T 2230/06; B60T 2250/03; B62D 53/08
See application file for complete search history.

(56) References Cited

U.S. PATENT DOCUMENTS 5,001,639 A * 3/1991 Breen ..................... B60T 7/20
                                                    303/123
10,173,722 B2   1/2019 Pourrezaei Khaligh et al.
(Continued)

FOREIGN PATENT DOCUMENTS

DE        4021717 A1    1/1992
DE    102012018914 A1    3/2014
(Continued)

*Primary Examiner* — Russell Frejd
(74) *Attorney, Agent, or Firm* — Leydig, Voit & Mayer, Ltd.

(57) ABSTRACT

A method for determining, by a utility vehicle having a trailer coupling, an articulation angle between the utility vehicle and a coupled vehicle trailer includes determining, with a model, a modelled value of the articulation angle or an articulation angle change. The method further includes determining, with a sensor unit, a measured value of an articulation angle or of an articulation angle change, and deriving, from the measured value, a correction value. The method additionally includes correcting the modelled value as a function of the correction value, and outputting the corrected modelled value as an output value of an articulation angle.

17 Claims, 5 Drawing Sheets

(56) References Cited

U.S. PATENT DOCUMENTS

| | | | | |
|---|---|---|---|---|
| 2002/0095251 | A1* | 7/2002 | Oh | B60T 8/243 |
| | | | | 701/70 |
| 2016/0049020 | A1* | 2/2016 | Kuehnle | G06T 7/75 |
| | | | | 701/34.4 |
| 2017/0320488 | A1* | 11/2017 | Alm | B60W 30/02 |
| 2018/0057052 | A1 | 3/2018 | Dodd et al. | |

FOREIGN PATENT DOCUMENTS

| | | |
|---|---|---|
| DE | 102012022807 A1 | 5/2014 |
| DE | 102017125662 A1 | 5/2018 |
| EP | 2479086 A2 | 7/2012 |
| EP | 2913240 A2 | 9/2015 |
| WO | WO 2019083912 A1 | 5/2019 |

* cited by examiner

METHOD FOR A UTILITY VEHICLE WHICH HAS A TRAILER COUPLING, DEVICE AND UTILITY VEHICLE FOR SAID METHOD, AND COMPUTER PROGRAM PRODUCT FOR SAME

CROSS REFERENCE TO RELATED APPLICATIONS

This application is a U.S. National Phase Application under 35 U.S.C. § 371 of International Application No. PCT/EP2019/064279, filed on Jun. 3, 2019, and claims benefit to German Patent Application No. DE 10 2018 114 852.6, filed on Jun. 20, 2018. The International Application was published in German on Dec. 26, 2019, as WO 2019/243027 A1 under PCT Article 21(2).

FIELD

The invention relates to the field of utility vehicles and, in particular, to determination of an articulation angle between a utility vehicle and a trailer vehicle which is towed by the utility vehicle.

BACKGROUND

In the field of utility vehicles it is known to record measured values in order to determine an operating state or driving state of the utility vehicle itself or else of a vehicle trailer which is towed by the utility vehicle. The measured values relating to the current operating state or driving state can then be used in driving assistance systems or safety systems to assist or inform the vehicle driver or to automatically counteract unstable or unsafe states when such states occur.

In addition to the direct determination of measured values with sensors, it is also known to estimate variables or variable quantities indirectly using other measured values or known quantities or to model them using said measured values or known quantities. An example of this is to determine an articulation angle between a utility vehicle and a vehicle trailer which is towed by the utility vehicle. Such an articulation angle is modelled, for example, by taking into account a measured speed, a measured yaw rate of the utility vehicle and fixed geometric parameters. The modelling is carried out in the form of a calculation with formulas which are known per se. The articulation angle which is determined in this way can be taken into account, for example, in safety systems of the vehicle such as, for example, an electronic stability control (ESP [electronic stability program]).

The monitoring of an articulation angle preferably also serves to warn a vehicle driver if the vehicle trailer has jack-knifed too much in comparison with the utility vehicle, for example during reverse travel through tight bends. As a result, for example, it is possible to avoid connecting cables, connecting lines or connecting hoses from being torn off between the utility vehicle and the vehicle trailer if the vehicle driver reacts to the warning.

There has also recently been an increase in desire to use a known articulation angle between a utility vehicle and a vehicle trailer to permit partial or completely autonomous driving of the utility vehicle to which a vehicle trailer is coupled. However, in this context a modelled articulation angle is usually not suitable to model the real behavior during reverse travel.

Even in the case of predominantly linear reverse travel of the utility vehicle, a vehicle trailer which is then pushed by the utility vehicle experiences cornering which becomes tighter and tighter. This always occurs under real conditions, since even when preceding forward travel has been directed straight ahead an articulation angle is always present before the start of reverse travel, which angle may be very small but can never be precisely zero degrees. Such an articulation angle which is therefore initially small increases even in the case of reverse travel which is continued in a straight direction, without the modelled articulation angle reflecting this increase in the real articulation angle.

Therefore, sensor arrangements are known from the prior art for also permitting a direct articulation angle measurement in addition to the absolute articulation angles which are determined indirectly by means of the modelling.

Such measurements are implemented, for example, by optical methods which are based on the evaluation camera images. Furthermore, laser systems are known which detect contours of the vehicle trailer. However, these systems frequently have a high sensitivity to dirt and only permit a very limited measuring range of usually less than 45°, which also comprises a measuring inaccuracy of more than one degree. In particular, optical methods are frequently light-dependent or sensitive. Furthermore, mechanical systems are also known which, however, frequently have to be calibrated in a complicated way for every journey.

SUMMARY

In an embodiment, the present invention provides a method for determining, by a utility vehicle having a trailer coupling, an articulation angle between the utility vehicle and a coupled vehicle trailer. The method includes determining, with a model, a modelled value of the articulation angle or an articulation angle change, determining, with a sensor unit, a measured value of an articulation angle or of an articulation angle change, and deriving, from the measured value, a correction value. The method additionally includes correcting the modelled value as a function of the correction value, and outputting the corrected modelled value as an output value of an articulation angle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
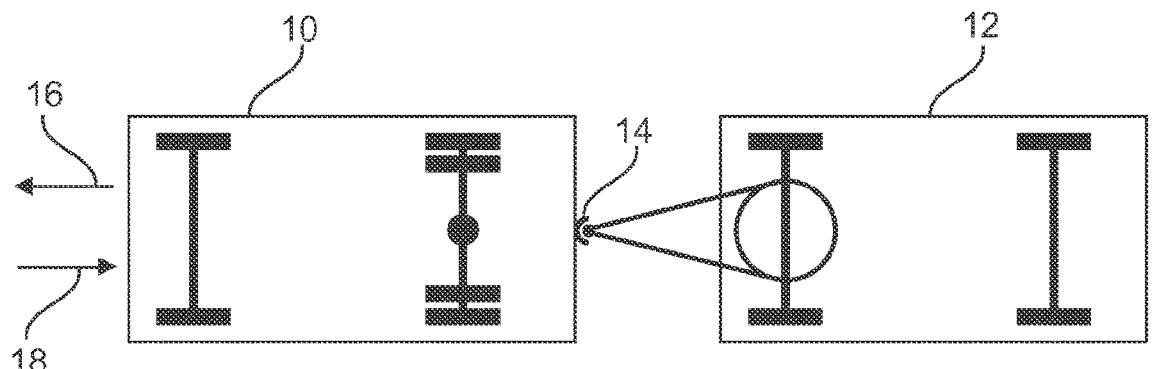
FIG. 1 shows a utility vehicle with a vehicle trailer.

The present disclosure provides a method and a device that counteract problems of the prior art. In particular, a solution according to the present disclosure permits an articulation angle between a utility vehicle and a vehicle trailer which is towed by the utility vehicle to be determined robustly and particularly accurately. In particular, an articulation angle between the utility vehicle and the vehicle trailer can be reliably detected also in the case of reverse travel of the utility vehicle.

For this purpose, the present disclosure provides a method for a utility vehicle having a trailer coupling. The utility vehicle is preferably a tractor. The method serves to determine an articulation angle between the utility vehicle and a coupled vehicle trailer. In the event of the utility vehicle being a tractor, the vehicle trailer is embodied as a semi-trailer. An articulation angle preferably describes below the angle between a longitudinal axis of the utility vehicle and a longitudinal axis of the vehicle trailer or between a transverse axis of the utility vehicle and a transverse axis of the utility vehicle.

The method firstly comprises determining a modelled value of an articulation angle or of an articulation angle change with a model. This is preferably done in a step a). In a step b), a measured value of an articulation angle or an articulation angle change is then determined with a sensor. In addition, in a step c) a correction value is derived from the measured value, wherein in step d) the modelled value is corrected as a function of the correction value. In step e), the corrected modelled value is then output as an output value of an articulation angle.

The method accordingly utilizes a measured value which is representative of a real articulation angle or of an articulation angle change, in order to correct or adapt the modelled value of an articulation angle. In this context, use is accordingly made of the fact that in normal driving situations the modelled value is predominantly sufficiently well determined, but in the event of this modelled value being sufficiently inaccurate, which can be determined for example by the measured value, the modelled value is corrected by the measured value.

Therefore, a precise articulation angle between the utility vehicle and the vehicle trailer can be determined in particular in special driving situations such as, for example, reverse travel.

According to a first embodiment of the method, the modelled value which is determined in step a) is an absolute value of an articulation angle. The modelled value therefore specifies, for example, indirectly a value for an articulation angle in degrees. In comparison, the value measured in step b) corresponds to a relative value of an articulation angle, that is to say any value which is merely dependent on or representative of the prevailing articulation angle.

Accordingly, use is made of the fact that for the correction of the modelled value it is sufficient that only one articulation angle change is considered, specifically by considering two successive relative measured values, in order to take into account said values in the correction of the modelled value. It is not necessary to determine an absolute value by means of the measurement since an absolute value is already made available by the modelling. Therefore, in order to determine a measured value, a sensor which only picks up relative values can be used for the method. For example, accordingly it is possible to use a favorable rotational rate sensor which has a wheel and is arranged, for example, on the utility vehicle, and the wheel of which is rotated relative to the cornering by a coupled vehicle trailer. Accordingly, sufficient relative values of the sensor can be considered in conjunction with the absolute values of the model, so that previous calibration of the sensor to determine an absolute value is not necessary.

According to a further embodiment, in step c) the correction value is determined as a function of the measured value determined in b) and additionally as a function of an output value which is output in a preceding step e).

Accordingly, the modelled value is corrected on the basis of a correction value which takes into account not only the measured value but also a previously output value. As a result, the measured value can be smoothed, so that large deviations in the measured value from the previously corrected modelled value, which possibly come about as a result of errors, are taken into account to a lesser extent in the correction.

According to one further embodiment, the steps a) to e) are executed iteratively. The steps a) to e) are preferably executed iteratively with a predefined repetition frequency, that is to say repeated. Accordingly, step b) therefore follows step a), step c) follows step b), step d) follows step c) and step e) follows d), and then step a) again follows step e), etc. As a result an output value is output continuously, specifically preferably with a repetition frequency, so that current articulation angles are always available for further use in driving assistance systems or safety systems of the utility vehicle.

According to a further embodiment, each determined modelled value, each output value, each determined measured value and each corrected measured value is respectively assigned a variance. In this context, in step a) a variance of the modelled value is additionally determined. In step b) a variance of the measured value is additionally determined. In step c) a variance of the correction value is additionally determined, and in step d) a variance of the output value is additionally determined.

A statement can be made about the correctness of the output value by determining the variance of the corresponding values and preferably taking into account a variance of one or more values in a subsequent step. As a result, a driving assistance system or safety system can utilize the variance in conjunction with the output value in order to take into account the effect of the articulation angle which is output as an output value during the intervention in travel by the corresponding system. In particular in the case of an unsafe articulation angle, that is to say an output value with a comparatively high variance, it is therefore possible to take into account this articulation angle to a lesser extent in an intervention of the driving assistance system or safety system than an output value, that is to say an articulation angle, with a comparatively smaller variance. It is therefore possible to avoid a situation in which owing to an inaccurately or incorrectly determined articulation angle there is a faulty intervention into the driving assistance system or safety system.

According to one further embodiment, step c), specifically the derivation of a correction value from a measured value and preferably an output value which has been output previously as well as particularly preferably the determination of the variance of a correction value, corresponds to a prediction step of a Kalman filtering process. According to this embodiment, step d), specifically the correction of the modelled value in accordance with the correction value corresponds to a correction step of a Kalman filtering process. The Kalman filtering process preferably corresponds to a unidimensional Kalman filtering process, that is to say to the calculation with a unidimensional Kalman filter. A unidimensional Kalman filter can also be referred to as a first order Kalman filter.

For example the following formulas are executed in the correction step:

$$\sigma_{neu}^2 = \frac{1}{\frac{1}{\sigma_1^2} + \frac{1}{\sigma_2^2}}$$

$$\mu_{neu} = \frac{\sigma_2^2 \cdot \mu_1 + \sigma_1^2 \cdot \mu_2}{\sigma_1^2 + \sigma_2^2}$$

Here, $\sigma_{neu}^2$ corresponds to the variance of the output value, $\sigma_2^2$ corresponds to the variance of the modelled value, and $\sigma_1^2$ corresponds to the variance of the correction value. Furthermore, $\mu_{neu}$ corresponds to the output value, $\mu_1$ corresponds to the correction value and $\mu_2$ corresponds to the modelled value.

Furthermore, the following formulas are executed in the prediction step:

$$\sigma_{neu}^2 = \sigma_1^2 + \sigma_2^2$$

$$\mu_{neu} = \mu_1 + \mu_2$$

Here, $\sigma_{neu}^2$ corresponds to the variance of an expected value, which corresponds to the variance of the correction value for the next correction step. The value $\sigma_1^2$ corresponds to the variance of the output value and $\sigma_2^2$ corresponds to the variance of the measured value. Furthermore, $\mu_{neu}$ corresponds to an expected value which corresponds to the correction value for the next correction step. $\mu_1$ corresponds to the output value and $\mu_2$ corresponds to the measured value.

The steps of the prediction step and correction step of a Kalman filter can easily be implemented by means of computer program code, so that the method can be effectively executed on a processor with comparatively little computational outlay.

According to one further embodiment, before the initial execution of the successive steps a) to e), the steps a), d) and e) are firstly executed. The execution of steps a), d) and e) before an initial execution of the successive steps a) to e) is also referred to as an initialization step. The correction value in the initialization step is replaced by a predefined initial correction value, and the variance of the correction value is replaced by a predefined initial variance of the correction value. Accordingly, before the initial execution of the successive steps a) to e), a modelled value is firstly determined in the initialization step and the modelled value is corrected as a function of the predefined initial correction value and preferably as a function of the predefined initial variance of the correction value. Therefore, the corrected modelled value can already be determined and output without an actually measured value being present. At the time of the initialization step, a measured value is advantageously already measured at the same time as the determination of the modelled value and its variance, and said value is then used in the following pass through steps a) to e).

By means of the initialization step it is therefore possible to ensure that a stable initial state for executing the method is produced. In particular, by selecting a predefined initial correction value and by means of a predefined initial variance of the correction value, the influence of the correction, on the modelled value and therefore the output value, can be selected early, specifically already at the first iteration step of the method.

According to a further embodiment, in step a), a modelled value is determined as a function of at least one speed value, at least one yaw angle value of the utility vehicle as well as at least one predefined geometry value of the utility vehicle and/or of the vehicle trailer. Geometry values are here, for example, parameters of the utility vehicle such as the wheelbase, distance between the rear axle of the utility vehicle and a trailer coupling or, in particular, the securing region of a kingpin of a fifth wheel. Geometry values for the vehicle trailer are the distance between the kingpin and a center of the axles in the case of a plurality of non-jointly-steered axles, or between a trailer coupling and a steered axle, as well as also the wheelbase.

Therefore, a modelled value can easily be determined by customary geometric consideration as a function of sensor data which are present in any case.

According to a further embodiment, in the case of reverse travel of the utility vehicle the variance of the modelled value is defined as being very large, specifically tending towards the infinite, that is to say infinitely large. It is considered here that the model may no longer be appropriate for determining the articulation angle during reversing and therefore owing to its particularly high assumed variance, the modelled articulation value is essentially no longer taken into account in the correction step d). The correction value which is derived from the measured value is therefore output essentially as an output value. A direct dependence of the output value on the measured value can therefore be possible without basically intervening in the sequence of the method. This is done solely by changing the variance of the modelled value.

According to a further embodiment, the measured value and the modelled value are monitored, and in the case of an essentially constant measured value with a changing modelled value, while the steps a) to e) are successively executed at least twice, said values are signaled as travel without a trailer. It is therefore possible to monitor for the presence of the vehicle trailer during travel.

Furthermore, the present disclosure provides a device having a control device (ECU), specifically in particular a vehicle control device (VCU) or a brake control device (EBS). The control device is configured to execute the method according to one of the abovementioned embodiments. Furthermore, the control device comprises at least one data input for connecting to a sensor unit and for receiving sensor values for determining the measured value of an articulation angle or of an articulation angle change from the sensor unit. Furthermore, if the control device is different from a brake control device, that is to say if the control device is not a brake control device, said control device comprises a data input for connecting to the brake control device for receiving values for determining the modelled value of an articulation angle or of an articulation angle change from the brake control device. The data inputs can be embodied as common data inputs or as separate data inputs.

In this context use is made of the fact that data such as vehicle speeds and yaw rates are available in any case in the brake control device and can therefore be easily used to determine the modelled value.

According to a further embodiment, the device comprises the sensor unit, wherein the sensor unit is configured to detect a relative articulation angle between the utility vehicle and the vehicle trailer.

An articulation angle change can therefore be easily determined by means of two successively measured relative articulation angles and made available to the control device for the further calculation of the output value.

According to one further embodiment of the device, the control device comprises a model former and a function block. The model former is configured to determine a modelled value of an articulation angle. The function block is configured to correct the modelled value as a function of sensor data of the sensor, which comprises a measured value, and to output the corrected modelled value as a signal.

Furthermore, according to one exemplary embodiment the sensor unit comprises a wheel which can rotate about an axle and can be attached to a mount on the utility vehicle. The mount is configured to place a circumferential contact face of the wheel in contact with the vehicle trailer. The sensor unit can therefore be implemented cost-effectively in a simple way.

Furthermore, the present disclosure provides a utility vehicle having a device according to one of the abovementioned embodiments and to a computer program for executing the method according to one of the above mentioned embodiments when said method is executed on a control device of a device according to one of the above mentioned embodiments.

FIG. 1 shows a utility vehicle 10 which is connected to a vehicle trailer 12 via a trailer coupling 14. The utility vehicle 10 has a drive (not illustrated) with which the utility vehicle 10 can be driven and which tows the vehicle trailer 12, coupled thereto, in the case of forward travel 16 or pushes it in the case of reverse travel 18.

Figure 2:
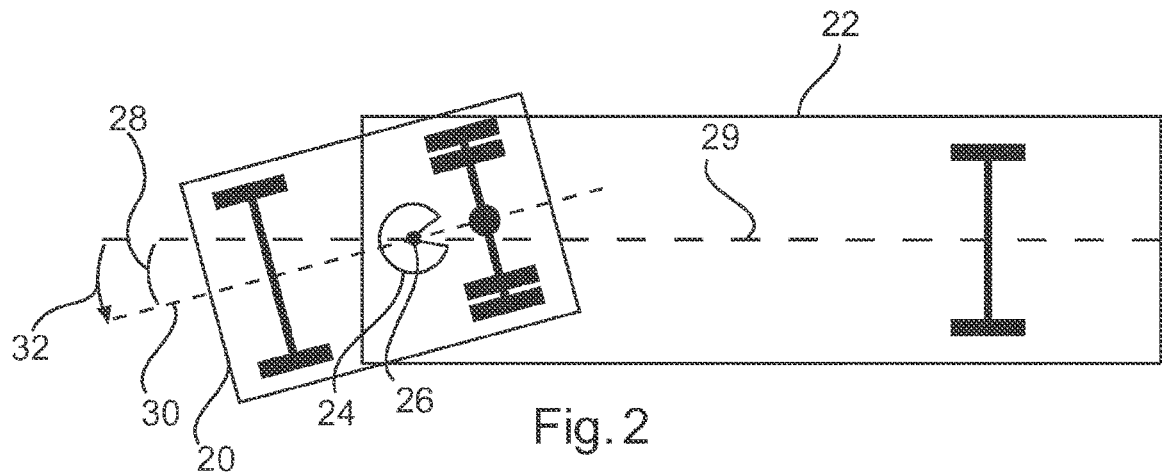
FIG. 2 shows an articulated truck with a semi-trailer.

FIG. 2 also shows a utility vehicle 10, which is, however, embodied here as a tractor 20. The tractor 20 also tows a vehicle trailer 12 which is, however, embodied here as a semi-trailer 22. The semi-trailer 22 is also coupled to the tractor 20 via a trailer coupling 14, which is, however, embodied in FIG. 2 as a fifth-wheel coupling 24. The fifth-wheel coupling 24 is arranged on the tractor 20 and secures a kingpin 26 of the semi-trailer 22, so that by means of the fifth-wheel coupling 24 and the kingpin 26 coupled therein, the tractor 20 can tow the semi-trailer 22 in the case of forward travel 16 and push it in the case of reverse travel 18.

Between the tractor 20 and the semi-trailer 22 there is here an articulation angle 28 of, for example, approximately 20 degrees, which occurs, for example, in the case of left-hand cornering of the tractor. The articulation angle 28 is defined as an angle between the longitudinal axes of the utility vehicle 10 and a vehicle trailer. Accordingly, the articulation angle 28 corresponds here to the angle between a longitudinal axis 29 of the semi-trailer 22 and a longitudinal axis 30 of the tractor. The longitudinal axes 29, 30 are accordingly located one on top of the other in the case of forward travel 16 which is directed straight ahead, so that an articulation angle of zero or essentially zero degrees occurs. If the tractor 20 then experiences forward travel 16 in a left-hand bend, as illustrated here, the articulation angle changes from zero degrees, with an articulation angle change 32, to the articulation angle 28 illustrated here. The articulation angle 28 or the articulation angle change 32 is to be determined as accurately as possible.

Figure 3:
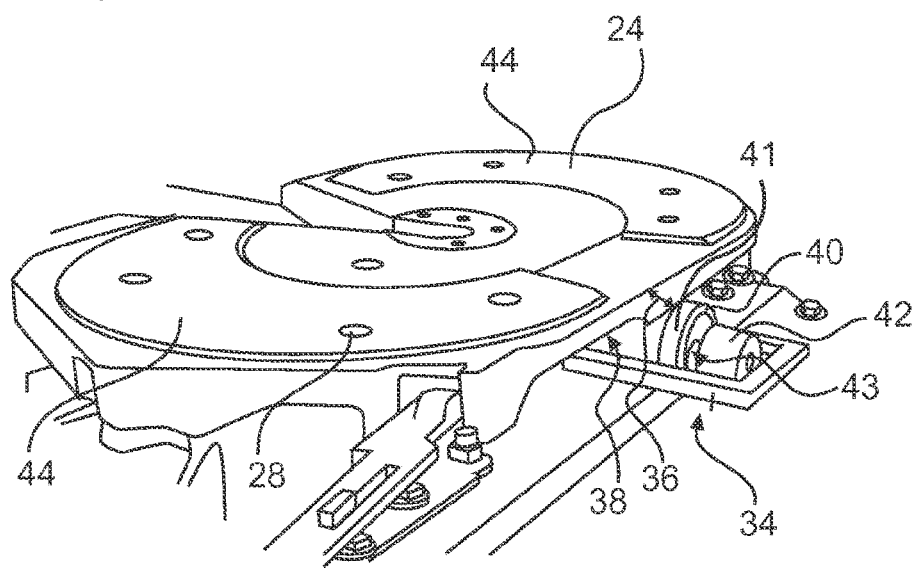
FIG. 3 shows a view of a fifth-wheel coupling with a sensor unit.

FIG. 3 shows a perspective view of the fifth-wheel coupling 24 with a sensor unit 34 which is arranged at a distance 36 on a front side 38 of the fifth-wheel coupling 24. The sensor unit 34 comprised a wheel 40 which is connected to a rotational speed sensor 42 via an axle 43. If a semi-trailer 22 is secured to the kingpin 26 in the fifth-wheel coupling 24, the semi-trailer 22 rests on friction linings 44 of the fifth-wheel coupling. Rotating the semi-trailer 22 on the fifth-wheel coupling 24 causes the wheel 40 to move about the axle 43 so that this movement can be detected and interpreted as an articulation angle change 32.

In order to bring about the contact between the semi-trailer 22 and the sensor unit 34, the wheel 40 has a contact face 41 which is pressed against the semi-trailer 22 on the underside of the semi-trailer 22.

Figure 4:
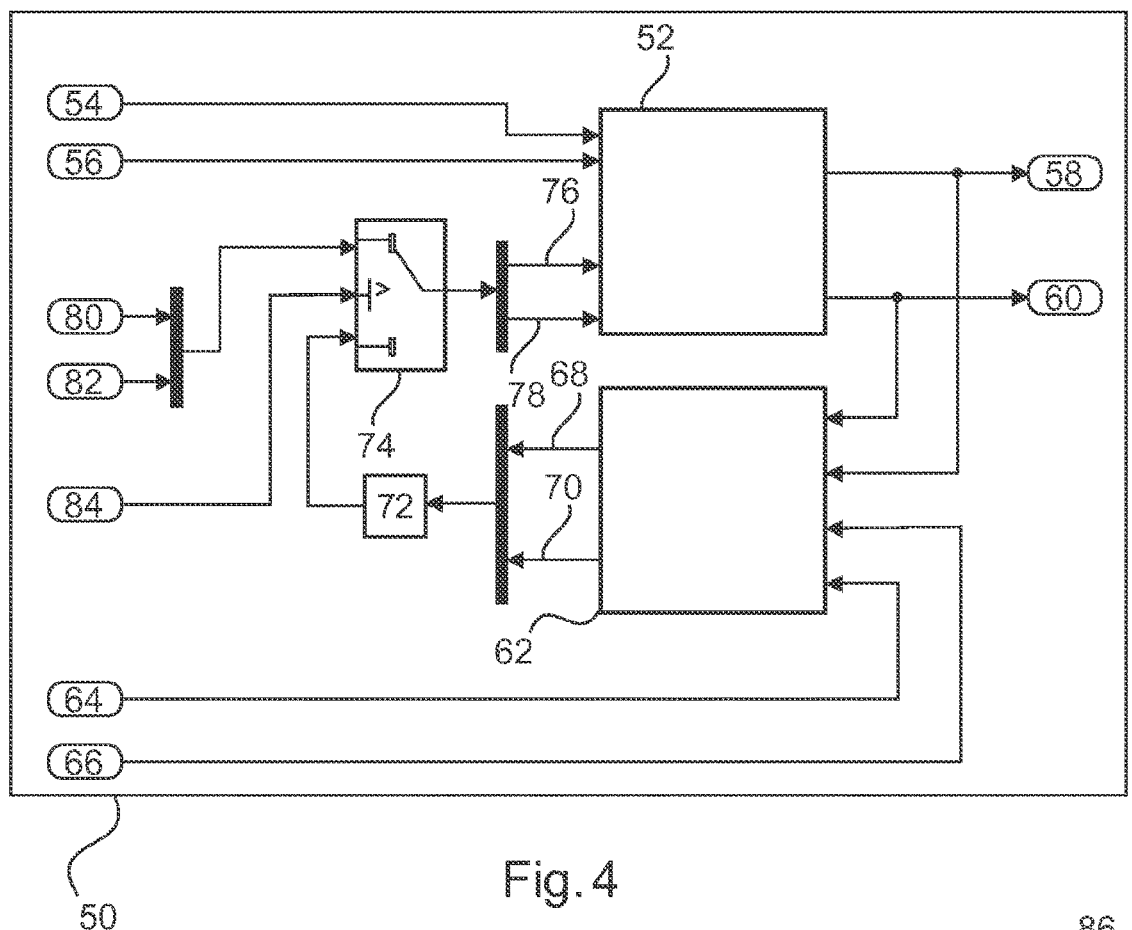
FIG. 4 shows a block diagram of the method.

FIG. 4 shows an exemplary embodiment, specifically as a block diagram of the method 50. A modelled value 54 of an articulation angle 28 and a variance 56 of the modelled value 54 are determined as input variables. These are fed to a correction step 52. Furthermore, a correction value 76 and a variance 78 of the correction value 76 are fed to the correction step 52. When the correction step 52 is executed the first time, the correction value 76 corresponds to an initial correction value 80, which is predefined, and the variance 78 of the correction value 76 corresponds to an initial variance 82 of the initial correction value 80, which is also predetermined.

A decision element 74, which is embodied for example as a multiplexer, assigns the initial correction value 80 and the initial variance 82 to the correction value 76 and to the variance 78 of the correction value 76 for the correction step 52.

In the correction step 52, a corrected modelled value 58 is output as an output value 58, and a variance 60 of the corrected modelled value 58 is output as a variance 60 of the output value 58. The output value 58 is calculated by firstly multiplying the modelled value 54 by the variance 78 of the correction value 76 and also multiplying the correction value 76 by the variance 56 of the modelled value 54. The products are added and divided by the sum of the variance 56 of the modelled value 54 and of the variance 78 of the correction value 76.

The variance 60 of the output value 58 is determined by adding the reciprocal values of the variance 56 of the modelled value 54 and the variance 78 of the correction value 76, and the reciprocal value of the sum is determined. The output value 58 and the variance of the output value 60 are then fed to a prediction step 62, wherein a measured value 64 and a variance 66 of the measured value 64 are additionally fed to the prediction step 62.

An expected value 68 and a variance 70 of the expected value 68 are then determined in the prediction step 62. The expected value 68 corresponds to a sum of the output value 58 and of the measured value 64, while the variance 70 of the expected value 68 corresponds to the sum of the variance 60 of the output value 58 as well as to the variance 66 of the measured value 64. The expected value 68 and the variance 70 of the expected value 68 are buffered in a delay element 72 for a clock cycle and are then fed to the correction step 52 via the decision element 74. In this context, the expected value 68 is fed as a correction value 76 to the correction step 52, and the variance 70 of the expected value 68 is fed as a variance 78 of the correction value 76 to the correction step 52.

Accordingly, the correction step 52 and the prediction step 62 are therefore executed alternately, for example with a predetermined repetition rate. The modelled value 54 and its variance 56 as well as the measured value 64 with its variance 66 are preferably also determined with the same repetition rate. In this context, the delay element 72 ensures that in the correction step a current modelled value 54 with its variance 56 with the measured value 64 determined from the previous pass is processed with its variance 66.

Figure 5:
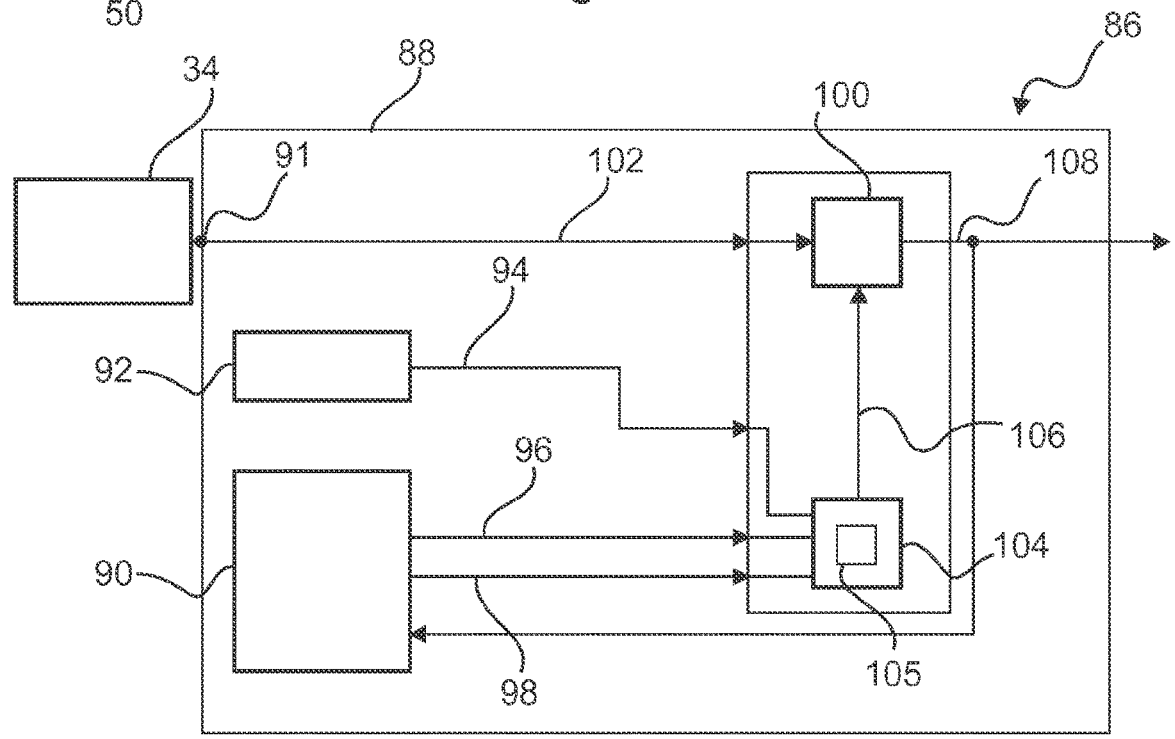
FIG. 5 shows an exemplary embodiment of the device.

FIG. 5 shows an exemplary embodiment of the device 86. The device 86 comprises a control device 88, which is preferably a brake control device 88. The control device 88 also has an electronic stability control 90. Speeds and yaw rates of the utility vehicle are preferably fed regularly to the electronic stability control 90 via a CAN bus (not illustrated). Furthermore, a memory 92 is present in which geometry data of the utility vehicle 10 and/or of the vehicle trailer 12 are or can be stored. The geometry data 94, the speed values 96 and the yaw rates 98 are fed to a model former 104. The model former 104 comprises a model 105 for determining a modelled value 54 of an articulation angle, on the basis of the speed 96, the yaw rates 98 and the geometry data 94.

The modelled value 54 of an articulation angle 28 and a variance 56 of the modelled value 54 are output as data 106. This data 106 is fed to a function block 100, wherein sensor data 102 of the sensor unit 34 is also fed to the function block 100. The method described above in FIG. 4 is then executed in the function block 100. Furthermore, a signal 108 is output which contains, for example, the output value 58 and its variance 60, as described in FIG. 4. The signal 108 is also fed to the electronic stability control 90, in order to take it into account during interventions into a vehicle controller by the electronic stability control 90.

Figure 6:
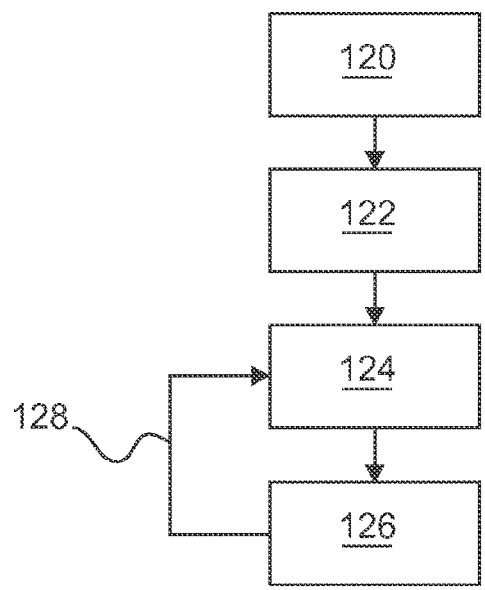
FIG. 6 shows steps of the method.

FIG. 6 shows selected steps of an exemplary embodiment of the method 50, which are executed, for example, with the device 86. In step 120 the method is in a reset state in which no values are output. Then, the method changes into an initialization step 122. In this context, the correction value 76 and the variance 78 of the correction value 76 are initialized. This is followed by a correction step 124, which is in turn followed by a prediction step 126. The correction step 124 and the prediction step 126 are preferably the steps of a Kalman filter. After the prediction step 126, a renewed correction step 124 occurs, as is illustrated by the arrow 128. The steps 124 and 126 therefore alternate until a reset signal (not illustrated) is received, as a result of which the method returns to step 120 (likewise not illustrated further).

Figure 7:
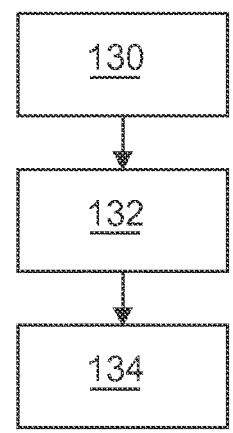
FIG. 7 shows steps of the correction step.

FIG. 7 shows a correction step 124 in detailed steps 130 to 134. In the step 130, a modelled value 54, a variance 56 of the modelled value 54, a correction value 76 and a variance 78 of the correction value 76 are received. In a step 132, the modelled value 54 is then corrected as a function of the variances 56, 78 and of the correction value 76. In the step 134, the corrected modelled value 58 is output as an output value 58.

Figure 8:
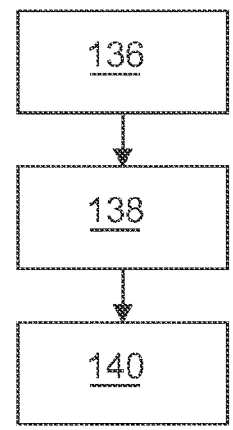
FIG. 8 shows steps of the prediction step.

FIG. 8 shows more detailed steps of the prediction step 126. In the step 136, the output value 58 and a variance 60 of the output value 58 as well as a measured value 64 and its variance 66 are received. In a step 138, an expected value 68 and a variance 70 of the expected value 68 are determined therefrom. These are output in step 140.

Figure 9:
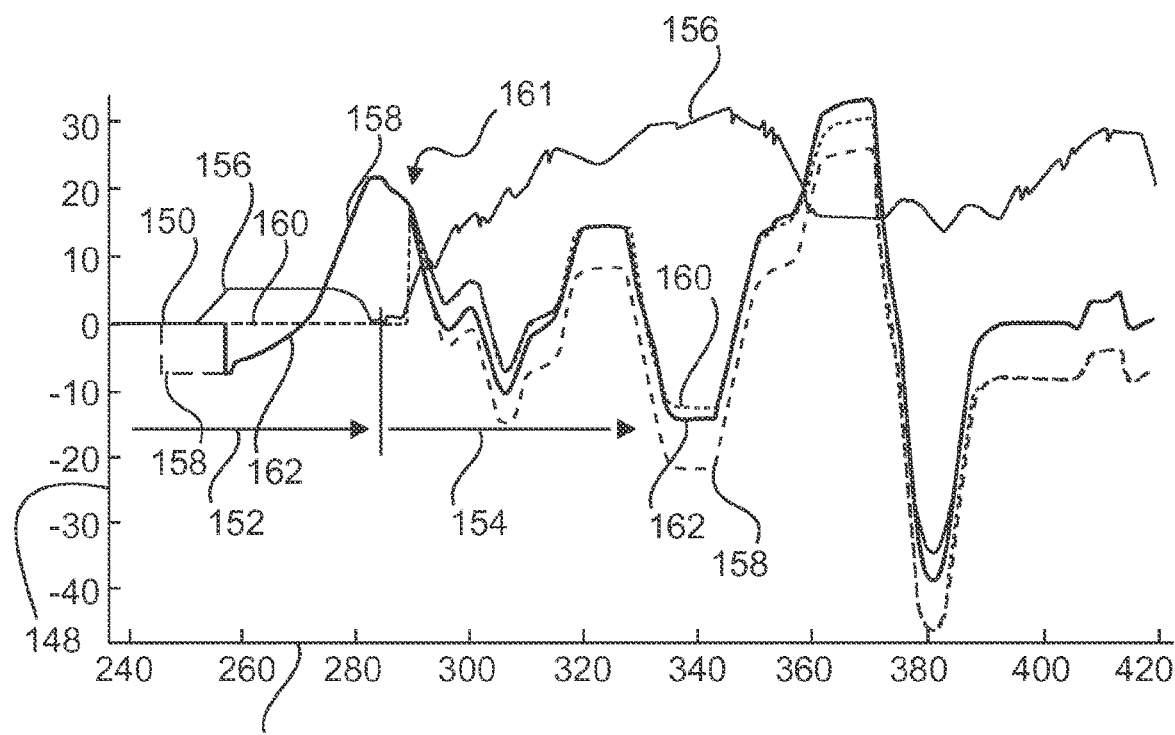
FIGS. 9-12 show illustrations of determined, derived, or corrected values of a method.

FIG. 9 shows a time axis 146 on which various values of articulation angles 148 between a utility vehicle 10 and a vehicle trailer 12 are illustrated. In this context, reverse travel 18 is illustrated in the region 152, and forward travel 16 is illustrated starting in the region 154 up to the end of the time axis. At a time 150, coupling of the vehicle trailer 12 to the utility vehicle takes place, as a result of which the measured value 54 which is illustrated by the dot-dash line 158 changes since a wheel of a sensor unit 34 is slightly rotated.

The curve 156 indicates the speed of the utility vehicle 10. This then rises slightly, i.e. the vehicle is accelerated in the reverse direction. A modelled value 54 is illustrated by means of the curve 160. It is apparent that the latter first runs linearly, that is to say the modelled value 54 apparently indicates reverse travel 18 which is directed straight ahead. However, this does not correspond to the real behavior. This is allowed for in that according to the method 50 the variance 56 of the modelled value 56 is set to tend toward infinity during reverse travel 18 so that an output value 58 results which is illustrated by the line 160. The output value 58 corresponds to the calculation by the Kalman filter and to a Kalman filtering process, into which value only the measured value 64, which is illustrated by the curve 158 and has relatively low variance 66, is input. As soon as the reverse travel 18 then ends and is continued as forward travel 16, the modelled value 54 (illustrated by the curve 160) rises until at a point 161 the modelled value 54, the measured value 64 and the output value 58 have virtually approximated to one another.

Figure 10:
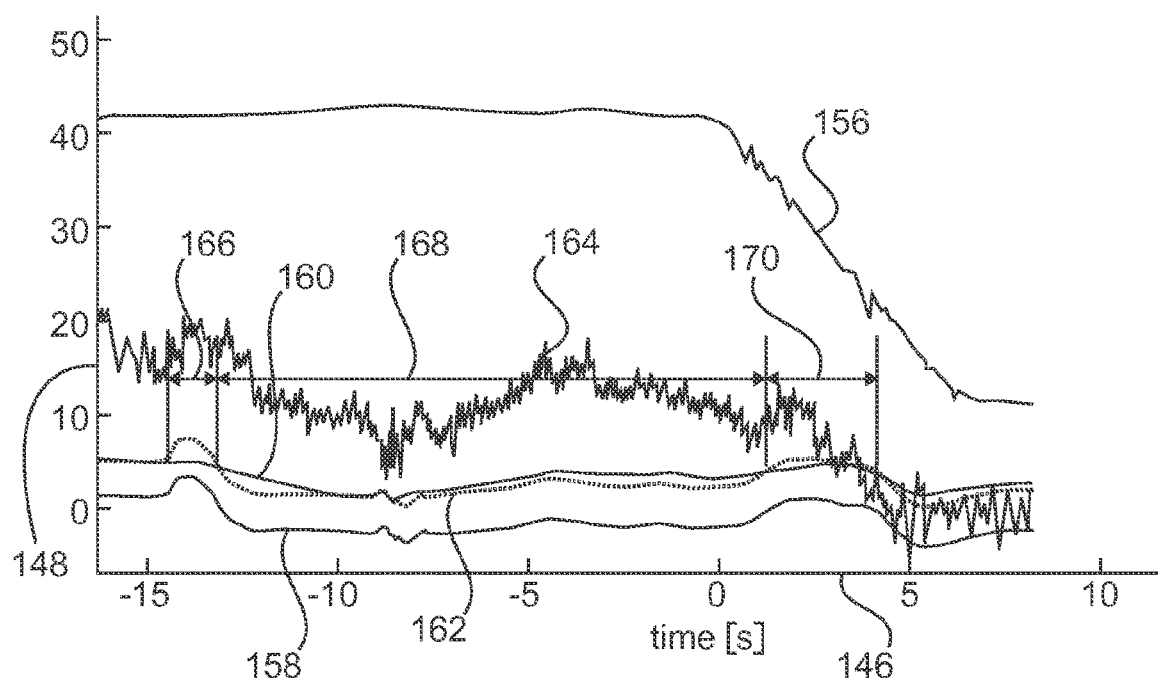

FIG. 10 shows in turn a time axis 146 against which the articulation angle 148 is plotted. The curve 156 corresponds again to a speed of the utility vehicle 10. The line 158 corresponds to the measured value 64, the dashed line 162 corresponds to the output value 58, and the curve 160 corresponds to the modelled value 54. Here, the method is used as an indicator of a low coefficient of friction during cornering. During cornering on a low coefficient of friction, the measured value 64 increases significantly in comparison with the modelled value 54. This also occurs in uncritical driving states during lateral acceleration processes. This is caused by the increase in the slip angle at the trailer owing to the low coefficient of friction of the road. Here, for example when T=−13, that is to say in the range 166, a change from wet asphalt to wet blue basalt is illustrated. This occurs at a speed of approximately 40 km/h with a lateral acceleration of 1 to approximately 2 m per square second, the lateral acceleration is illustrated by the curve 164. It can be clearly seen that as soon as the vehicle trailer 12 is located on wet blue basalt the output value 58 (illustrated by the curve 162) has an offset with respect to the modelled value 54 which is represented by the curve 160. This is a clear indicator of an inappropriate speed, so that an electronic brake system or an electronic stability control can switch on a warning lamp here, in order to inform the driver of this or even to reduce the speed by means of a reduction in torque.

Figure 11:
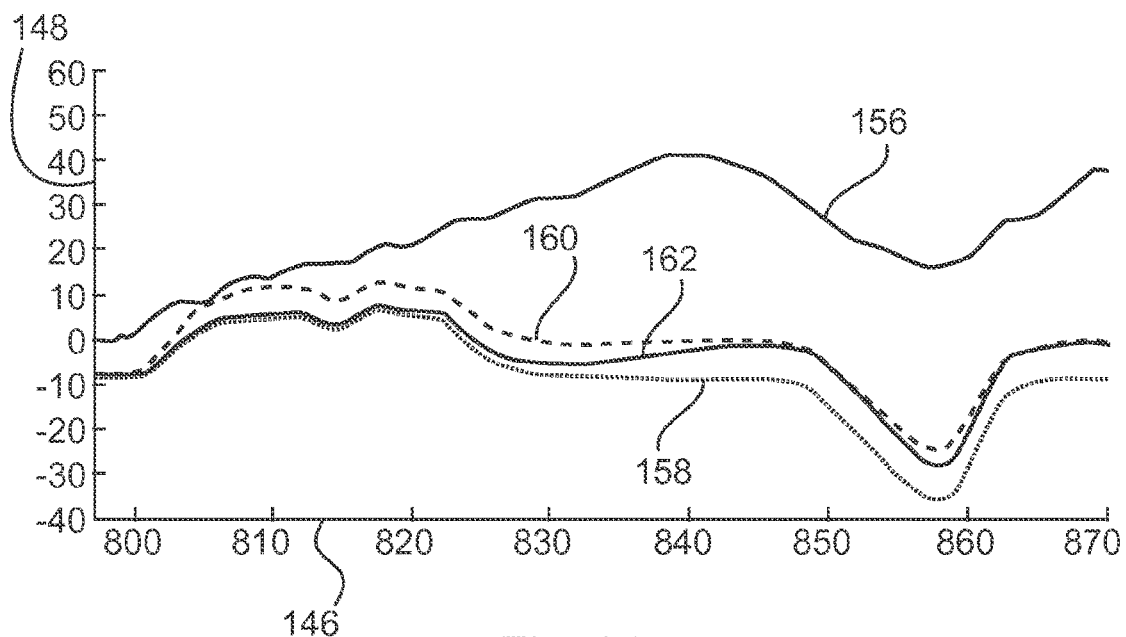

FIG. 11 shows an illustration of a comparison such as occurs with the method directly after starting of the vehicle. For this purpose, the time is plotted in seconds on the axis 146 again and the resulting articulation angles are plotted on the axis 148. At the time t=800 seconds, a vehicle star occurs. In this context, the curve 160 indicates the modelled value 54, the curve 162 indicates the output value 58, and the curve 158 indicates the measured value 64. The curve 156 shows the speed. Despite cornering, the output value 58 according to the curve 162 quickly approaches the modelled value 54 according to the curve 160. As the distance increases, the variance 56 of the modelled value 54 decreases, wherein the measured value 64 is always constant. At large articulation angles, the variance 56 of the modelled value 54 increases again, owing to model errors. This leads to a situation in which the output value 58 deviates in the direction of the measured value 64 (see, for example, at T=858 seconds).

Figure 12:
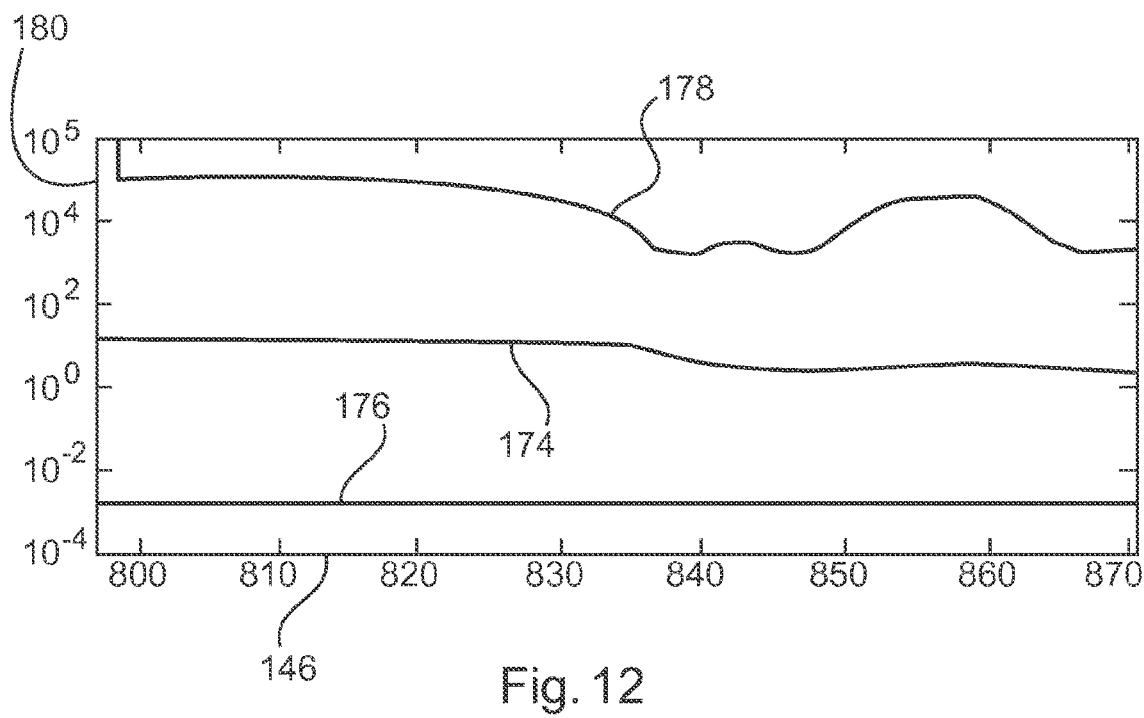

The corresponding variances are for this purpose illustrated in FIG. 12, wherein in FIG. 12 the same times as in FIG. 11 are illustrated on the time axis 146, and the variance is plotted on the axis 180. In this context, the curve 176 then shows the variance 66 of the measured value 64, the curve 174 shows the variance 60 of the output value 58, and the curve 178 shows the variance 56 of the modelled value 54.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Utility vehicle
12 Vehicle trailer
14 Trailer coupling
16 Forward travel
18 Reverse travel
20 Tractor
22 Semi-trailer
24 Fifth-wheel coupling
26 Kingpin
28 Articulation angle
29 Longitudinal axis of the semi-trailer
30 Longitudinal axis of the tractor
32 Articulation angle change
34 Sensor unit
36 Distance
38 Front side
40 Wheel
41 Contact face
42 Rotational speed sensor
43 Axle
44 Friction linings
50 Method
52 Correction step
54 Modelled value
56 Variance of the modelled value
58 Corrected modelled value/output value
60 Variance of the corrected modelled value/variance of the output value
62 Prediction step
64 Measured value
66 Variance of the measured value
68 Expected value
70 Variance of the expected value
72 Delay element
74 Decision element
76 Correction value
78 Variance of the correction value
80 Initial correction value
82 Variance of the initial correction value
86 Device
88 Control device
90 Electronic stability control
92 Memory
94 Geometry data
96 Speed
98 Yaw rate
100 Function block
102 Sensor data
104 Model former
105 Model
106 Data
108 Signal
120-126 Steps of the method
130-134 Steps of the correction step
136-140 Steps of the prediction step
146 Time axis
148 Articulation angle
150 Time
152 Range of reverse travel
154 Range of forward travel
156 Speed
158 Line (measured value 64)
160 Line (modelled value 54)
162 Line (output value 58)
164 Lateral acceleration
166 First range
168 Second range
170 Third range
174 Line (variance 60 of the output value 58)
176 Line (variance 66 of the measured value 64)
178 Line (variance 56 of the modelled value)
180 Variance

The invention claimed is:

1. A method for a utility vehicle, in particular a tractor, having a trailer coupling, for determining an articulation angle between the utility vehicle and a coupled vehicle trailer, in particular a semi-trailer, the method comprising:
   a) determining, with a model, a modelled value of the articulation angle or an articulation angle change,
   b) determining, with a sensor unit, a measured value of an articulation angle or of an articulation angle change,
   c) deriving, from the measured value, a correction value,
   d) correcting the modelled value as a function of the correction value, and
   e) outputting the corrected modelled value as an output value of an articulation angle.

2. The method as claimed in claim 1, wherein in step a) the modelled value corresponds to an absolute articulation angle, and in step b) the measured value corresponds to a relative articulation angle.

3. The method as claimed in claim 1, wherein the steps a) to e) are executed iteratively.

4. The method as claimed in claim 3, wherein in step c) the correction value is determined as a function of the measured value and as a function of an output value which is output in a preceding step e).

5. The method as claimed in claim 1, wherein each determined modelled value, each output value, each measured value and each correction value is assigned a variance, wherein in step a) a variance of the modelled value is additionally determined, in step b) a variance of the measured value is additionally determined, in step c) a variance of the correction value is additionally determined, and in step d) a variance of the output value is additionally determined.

6. The method as claimed in claim 5, wherein in step d) the modelled value is additionally corrected as a function of the variance of the correction value and of the variance of the modelled value.

7. The method as claimed in claim 1, wherein step c) corresponds to a prediction step, and step d) corresponds to a correction step of a Kalman filtering process.

8. The method as claimed in claim 1, wherein before the initial execution of successive steps a) to e), the steps a), d) and e) are executed in an initialization step, wherein the correction value in step d) is replaced by a predefined initial correction value, and the variance of the correction value is replaced by a predefined initial variance of the initial correction value.

9. The method as claimed in claim 1, wherein in step a) a modelled value of the articulation angle is determined as a function of at least one speed value and of a yaw rate value of the utility vehicle as well as of a predefined geometry value of the utility vehicle and/or of the vehicle trailer.

10. The method as claimed in claim 1, wherein in the case of an articulation angle which is to be determined during reverse travel of the motor vehicle, the variance of the modelled value is defined as infinitely large.

11. The method as claimed in claim 1, wherein the measured value and the modelled value are monitored, and in the case of a constant measured value and a changing modelled value when the steps a) to e) are successively executed at least twice, the values are signaled as travel without a trailer, using a signal.

12. A device comprising:
a control device, in particular a brake control device, wherein the control device is configured to execute the method as claimed in claim 1,
wherein the control device has at least one data input which is configured to connect to a sensor unit and to receive sensor data for determining the measured value of an articulation angle or of an articulation angle change.

13. The device as claimed in claim 12, wherein the device comprises a sensor unit, and the sensor unit is configured to determine an articulation angle or an articulation angle change between the utility vehicle and the vehicle trailer.

14. The device as claimed in claim 12, wherein the sensor unit has a wheel which can rotate on an axle and can be attached, with a spacing, on the front side of a fifth-wheel coupling, and the wheel has a contact face configured to be placed in contact with a vehicle trailer.

15. The device as claimed in claim 12, wherein the control device comprises a model former and a function block, wherein the model former is configured to determine a modelled value of an articulation angle, and the function block is configured to correct the modelled value as a function of sensor data of the sensor which comprises a measured value, and to output the corrected modelled value as a signal.

16. A utility vehicle having a device as claimed in claim 12.

17. A computer program product having stored thereon computer-executable code that, when executed by a computer, causes the computer to carry out a method as claimed in claim 1.

* * * * *